United States Patent
Koenig et al.

(10) Patent No.: US 8,697,820 B2
(45) Date of Patent: *Apr. 15, 2014

(54) PROCESS FOR PREPARING HIGH-REACTIVITY ISOBUTENE HOMO- OR COPOLYMERS

(75) Inventors: Hannah Maria Koenig, Mannheim (DE); Klaus Muehlbach, Gruenstadt (DE); Thomas Wettling, Limburgerhof (DE); Ulrich Eichenauer, Boehl-Iggelheim (DE); Herbert Mayr, Starnberg (DE)

(73) Assignee: BASF SE, Ludwigshafen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/568,421

(22) Filed: Aug. 7, 2012

(65) Prior Publication Data
US 2013/0041121 A1 Feb. 14, 2013

Related U.S. Application Data

(60) Provisional application No. 61/522,277, filed on Aug. 11, 2011.

(51) Int. Cl.
| C08F 4/06 | (2006.01) |
| C08F 2/00 | (2006.01) |
| C08F 10/00 | (2006.01) |

(52) U.S. Cl.
USPC .................. 526/146; 526/209; 526/348.7

(58) Field of Classification Search
USPC ...................... 526/146, 209, 348.7
See application file for complete search history.

(56) References Cited

U.S. PATENT DOCUMENTS

| 2,045,592 A * | 6/1936 | Fitch, Jr. .................. 528/386 |
| 5,169,914 A | 12/1992 | Kaszas et al. |
| 5,340,881 A | 8/1994 | Kennedy et al. |
| 5,408,018 A | 4/1995 | Rath |
| 5,448,000 A | 9/1995 | Gullapalli et al. |
| 7,001,966 B2 * | 2/2006 | Lang et al. .................. 526/348.7 |
| 2011/0201772 A1 | 8/2011 | Koenig et al. |
| 2012/0142868 A1 * | 6/2012 | Konig et al. ............... 525/333.9 |
| 2012/0165473 A1 * | 6/2012 | Koenig et al. ............... 525/301 |
| 2012/0208971 A1 * | 8/2012 | Konig et al. ............... 526/193 |

FOREIGN PATENT DOCUMENTS

| CN | 101955558 | 1/2011 |
| DE | 27 02 604 A1 | 7/1978 |
| EP | 0 145 235 A1 | 6/1985 |
| WO | WO 99/64482 | 12/1999 |
| WO | WO 2006/011868 A1 | 2/2006 |
| WO | WO 2011/101281 A1 | 8/2011 |

OTHER PUBLICATIONS

U.S. Appl. No. 13/655,839, filed Oct. 19, 2012, Koenig, et al.
U.S. Appl. No. 13/765,031, filed Feb. 12, 2013, Wettling, et al.
U.S. Appl. No. 13/735,385, filed Jan. 7, 2013, Wettling, et al.
International Search Report and Written Opinion of the International Searching Authority Issued Nov. 26, 2012 in PCT/EP2012/065751 (with English translation of Categories of Cited Documents).
U.S. Appl. No. 13/503,710, filed Apr. 24, 2012, Hannah Maria Koenig, et al.

* cited by examiner

*Primary Examiner* — William Cheung
(74) *Attorney, Agent, or Firm* — Oblon, Spivak, McClelland, Maier & Neustadt, L.L.P.

(57) ABSTRACT

Preparation of high-reactivity isobutene homo- or copolymers with a content of terminal vinylidene double bonds per polyisobutene chain end of at least 50 mol % by polymerization of isobutene or isobutene-comprising monomer mixtures in the presence of Lewis acids suitable as polymerization catalysts or of complexes which are effective as polymerization catalysts and are formed from Lewis acids and donors, and in the presence of initiators, wherein the initiators used are organic sulfonic acids Z—$SO_3H$ in which the variable Z denotes an alkyl radical, haloalkyl radical, cycloalkyl radical, aryl radical or arylalkyl radical.

16 Claims, No Drawings

PROCESS FOR PREPARING HIGH-REACTIVITY ISOBUTENE HOMO- OR COPOLYMERS

This U.S. Patent Application claims benefit of U.S. Provisional Application No. 61/522,277 filed Aug. 11, 2011.

The present invention relates to a novel process for preparing high-reactivity isobutene homo- or copolymers with a content of terminal vinylidene double bonds per polyisobutene chain end of at least 50 mol %. The present invention further relates to novel isobutene polymers.

In contrast to so-called low-reactivity polymers, high-reactivity isobutene homo- or copolymers are understood to mean those polyisobutenes which comprise a high content of terminal ethylenic double bonds (α-double bonds), specifically in practice usually of at least 80 mol %, based on the individual chain ends of the polyisobutene macromolecules. In the context of the present application, vinylidene groups are understood to mean those double bonds whose position in the polyisobutene macromolecule is described by the general formula

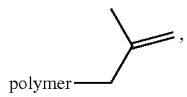

i.e. the double bond is present in an an position in the polymer chain. "Polymer" represents the polyisobutene radical shortened by one isobutene unit. The vinylidene groups exhibit the highest reactivity, for example in the thermal addition onto sterically demanding reactants such as maleic anhydride, whereas a double bond further toward the interior of the macromolecules in most cases exhibits lower reactivity, if any, in functionalization reactions. The uses of high-reactivity polyisobutenes include use as intermediates for preparing additives for lubricants and fuels, as described, for example, in DE-A 27 02 604.

Such high-reactivity polyisobutenes are obtainable, for example, by the process of DE-A 27 02 604 by cationic polymerization of isobutene in the liquid phase in the presence of boron trifluoride as a catalyst. A disadvantage here is that the polyisobutenes obtained have a relatively high polydispersity. The polydispersity is a measure of the molecular weight distribution of the resulting polymer chains and corresponds to the quotient of weight-average molecular weight $M_w$ and number-average molecular weight $M_n$ (PDI=$M_w/M_n$).

Polyisobutenes with a similarly high proportion of terminal double bonds but with a narrower molecular weight distribution are, for example, obtainable by the process of EP-A 145 235, U.S. Pat. No. 5,408,018 and WO 99/64482, the polymerization being effected in the presence of a deactivated catalyst, for example of a complex of boron trifluoride with alcohols and/or ethers.

High-reactivity polyisobutenes are also obtainable by living cationic polymerization of isobutene and subsequent dehydrohalogenation of the resulting polymerization product, for example by the process from U.S. Pat. No. 5,340,881. However, such a process is complex since the halogen end group introduced with the living cationic polymerization has to be eliminated in a separate step in order to generate the double bond.

It is additionally known that the Lewis acid aluminum trichloride can also be used as a polymerization catalyst for isobutene, for example from High Polymers, volume XXIV (part 2), p. 713-733 (editor: Edward C. Leonard), J. Wiley & Sons publishers, New York, 1971.

In the literature article "Cationic polymerization using heteropolyacid salt catalysts" in Topics in Catalysis Vol. 23, p. 175-181 (2003), James D. Burrington et al. indicate that, with aluminum trichloride as a polymerization catalyst for isobutene, only low-reactivity polyisobutenes with a low content of terminal vinylidene double bonds (α-double bonds) can be obtained. For instance, table 1 on page 178 of this literature article cites an example of a polyisobutene prepared with $AlCl_3$, which has a number-average molecular weight $M_n$ of 1000-2000, a polydispersity $M_w/M_n$ of 2.5-3.5 and a content of vinylidene isomer (α-double bond) of only 5% (in addition to 65% "tri", 5% "β" and 25% "tetra").

In the literature article "Novel initiating system based on $AlCl_3$ etherate for quasiliving cationic polymerization of styrene" in Polymer Bulletin Vol. 52, p. 227-234 (2004), Sergei V. Kostjuk et al. describe a catalyst system composed of 2-phenyl-2-propanol and an aluminum trichloride/di-n-butyl ether complex for polymerization of styrene. The polydispersities $M_w/M_n$ of the styrene polymers thus prepared are "~2.5" (see summary) or "~3" (see page 230).

International patent application PCT/EP2011/051929 describes a process for preparing high-reactivity isobutene homo- or copolymers with a content of terminal vinylidene double bonds per polyisobutene chain end of at least 50 mol %, in which isobutene or an isobutene-comprising monomer mixture is polymerized in the presence of an aluminum trihalide-donor complex effective as a polymerization catalyst or of an alkylaluminum halide-donor complex which comprises, as the donor, an organic compound with at least one ether function or a carboxylic ester function.

CN 101955558 A discloses that iron(III) chloride is suitable as a coinitiator in the cationic isobutene polymerization for preparation of high-reactivity polyisobutenes and copolymers thereof. The initiators recommended are water, phenols, protic acids such as sulfuric acid, tertiary alcohols, tertiary chlorides, tertiary carboxylic esters and carboxylic acids themselves. The complexing agents mentioned for the systems which initiate the polymerization are especially alkyl ethers.

WO 2006/011868 describes the polymerization of olefins using fluoro hydrocarbons as solvents. To the extent that isobutene polymers are addressed—more particularly, isobutene-isoprene copolymers ("butyl rubber") are emphasized therein—no reference is made to any possible high content of terminal vinylidene double bonds. The initiator system for polymerization may comprise sulfonic acids among other substances.

It was an object of the present invention to provide a process for preparing high-reactivity isobutene homo- or copolymers with a content of terminal vinylidene double bonds per polyisobutene chain end of at least 80 mol % and simultaneously with a narrow molecular weight distribution (i.e. low polydispersities) in acceptable yields. The catalyst system should at the same time have sufficient activity and service life, the handling thereof should be unproblematic and it should not be prone to failure.

The object was achieved by a process for preparing high-reactivity isobutene homo- or copolymers with a content of terminal vinylidene double bonds per polyisobutene chain end of at least 50 mol %, by polymerization of isobutene or of an isobutene-comprising monomer mixture in the presence of at least one Lewis acid suitable as a polymerization catalyst or of a complex which is effective as a polymerization catalyst and is formed from at least one Lewis acid and at least one donor, and in the presence of at least one initiator, which comprises using, as the at least one initiator, an organic sulfonic acid of the general formula Z—SO$_3$H in which the variable Z denotes a C$_1$- to C$_{20}$-alkyl radical, C$_1$- to C$_{20}$-haloalkyl radical, C$_5$- to C$_8$-cycloalkyl radical, C$_6$- to C$_{20}$-aryl radical or a C$_7$- to C$_{20}$-arylalkyl radical.

Isobutene homopolymers are understood in the context of the present invention to mean those polymers which, based on the polymer, are formed from isobutene to an extent of at least 98 mol %, preferably to an extent of at least 99 mol %. Accordingly, isobutene copolymers are understood to mean those polymers which comprise more than 2 mol % of copolymerized monomers other than isobutene, for example linear butene.

In the context of the present invention, the following definitions apply to generically defined radicals:

A C$_1$- to C$_8$-alkyl radical is a linear or branched alkyl radical having 1 to 8 carbon atoms. Examples thereof are methyl, ethyl, n-propyl, isopropyl, n-butyl, 2-butyl, isobutyl, tert-butyl, pentyl, 1-methylbutyl, 2-methylbutyl, 3-methylbutyl, 2,2-dimethylpropyl, 1-ethylpropyl, n-hexyl, 1,1-dimethylpropyl, 1,2-dimethylpropyl, 1-methylpentyl, 2-methylpentyl, 3-methylpentyl, 4-methylpentyl, 1,1-dimethylbutyl, 1,2-dimethylbutyl, 1,3-dimethylbutyl, 2,2-dimethylbutyl, 2,3-dimethylbutyl, 3,3-dimethylbutyl, 1-ethylbutyl, 2-ethylbutyl, 1,1,2-trimethylpropyl, 1,2,2-trimethylpropyl, 1-ethyl-1-methylpropyl, 1-ethyl-2-methylpropyl, n-heptyl, n-octyl and the constitutional isomers thereof, such as 2-ethylhexyl. Such C$_1$- to C$_8$-alkyl radicals may to a small extent also comprise heteroatoms such as oxygen, nitrogen or halogen atoms, for example chlorine or fluorine, and/or aprotic functional groups, for example carboxyl ester groups, cyano groups or nitro groups.

A C$_1$- to C$_{20}$-alkyl radical is a linear or branched alkyl radical having 1 to 20 carbon atoms. Examples thereof are the abovementioned C$_1$- to C$_8$-alkyl radicals, and additionally n-nonyl, isononyl, n-decyl, 2-propylheptyl, n-undecyl, n-dodecyl, n-tridecyl, isotridecyl, n-tetradecyl, n-hexadecyl, n-octadecyl and n-eicosyl. Such C$_1$- to C$_{20}$-alkyl radicals may to a small extent also comprise heteroatoms such as oxygen, nitrogen or halogen atoms, for example chlorine or fluorine, and/or aprotic functional groups, for example carboxyl ester groups, cyano groups or nitro groups.

A C$_1$- to C$_{20}$-haloalkyl radical or a C$_1$- to C$_8$-haloalkyl radical is a radical with the base skeletons specified above for C$_1$- to C$_{20}$-alkyl radicals or C$_1$- to C$_8$-alkyl radicals, but in which the hydrogen atoms have been replaced to a relatively high degree by halogen atoms, especially by fluorine and/or chlorine atoms. Preferably all or virtually all hydrogen atoms have been replaced by halogen atoms, especially by fluorine and/or chlorine atoms. Typical examples of such radicals are C$_1$- to C$_4$-alkyl radicals in which at least 60%, especially at least 75%, in particular at least 90%, of the number of the hydrogen atoms have been replaced by fluorine and/or chlorine atoms, for example dichloromethyl, trichloromethyl, difluoromethyl, trifluoromethyl, chlorodifluoromethyl, fluorodichloromethyl, pentachloroethyl or pentafluoroethyl.

A C$_5$- to C$_8$-cycloalkyl radical is a saturated cyclic radical which may comprise alkyl side chains. Examples thereof are cyclopentyl, 2- or 3-methylcyclopentyl, 2,3-, 2,4- or 2,5-dimethylcyclopentyl, cyclohexyl, 2-, 3- or 4-methylcyclohexyl, 2,3-, 2,4-, 2,5-, 2,6-, 3,4-, 3,5- or 3,6-dimethylcyclohexyl, cycloheptyl, 2-, 3- or 4-methylcycloheptyl, cyclooctyl, 2-, 3-, 4- or 5-methylcyclooctyl. Such C$_5$- to C$_8$-cycloalkyl radicals may to a small extent also comprise heteroatoms such as oxygen, nitrogen or halogen atoms, for example chlorine or fluorine, and/or aprotic functional groups, for example carboxyl ester groups, cyano groups or nitro groups.

A C$_6$- to C$_{20}$-aryl radical or a C$_6$- to C$_{12}$-aryl radical is preferably optionally substituted phenyl, optionally substituted naphthyl, optionally substituted anthracenyl or optionally substituted phenanthrenyl. Such aryl radicals may be a 1 to 5 aprotic substituents or aprotic functional groups, for example C$_1$- to C$_8$-alkyl, C$_1$- to C$_8$-haloalkyl such as C$_1$- to C$_8$-chloroalkyl or C$_1$- to C$_8$-fluoroalkyl, halogens such as chlorine or fluorine, nitro, cyano or phenyl. Examples of such aryl radicals are phenyl, naphthyl, biphenyl, anthracenyl, phenanthrenyl, tolyl, nitrophenyl, chiorophenyl, dichlorophenyl, pentafluorophenyl, pentachlorophenyl, (trifluoromethyl)phenyl, bis(tri-fluoromethyl)phenyl, (trichloro)methylphenyl and bis(trichloromethyl)phenyl.

A C$_7$- to C$_{20}$-arylalkyl radical or a C$_7$- to C$_{12}$-arylalkyl radical is preferably optionally substituted C$_1$- to C$_4$-alkylphenyl such as benzyl, o-, m- or p-methylbenzyl, 1- or 2-phenylethyl, 1-, 2- or 3-phenylpropyl or 1-, 2-, 3- or 4-phenylbutyl, optionally substituted C$_1$- to C$_4$-alkylnaphthyl such as naphthylmethyl, optionally substituted C$_1$- to C$_4$-alkylanthracenyl such as anthracenylmethyl, or optionally substituted C$_1$- to C$_4$-alkylphenanthrenyl such as phenanthrenylmethyl. Such arylalkyl radicals may bear 1 to 5 aprotic substituents or aprotic functional groups, especially on the aryl moiety, for example C$_1$- to C$_8$-alkyl, C$_1$- to C$_8$-haloalkyl such as C$_1$- to C$_8$-chloroalkyl or C$_1$- to C$_8$-fluoroalkyl, halogen such as chlorine or fluorine, nitro or phenyl.

The process according to the invention for preparation of high-reactivity isobutene homo- or copolymers generally proceeds—caused by the use of the complex which is effective as a polymerization catalyst and is formed from at least one Lewis acid and optionally at least one donor and the initiators described—by a cationic reaction mechanism.

The feature essential to the invention is the use of an organic sulfonic acid of the general formula Z—SO$_3$H as at least one initiator in the polymerization process according to the invention. It will be appreciated that it is also possible to use mixtures of different sulfonic acids Z—SO$_3$H. In addition to these sulfonic acid initiators, it is also possible to use further initiator molecules from other chemical substance classes.

The variable Z preferably represents a C$_1$- to C$_8$-alkyl radical, C$_1$- to C$_8$-haloalkyl radical, C$_5$- to C$_8$-cycloalkyl radical, C$_6$- to C$_{12}$-aryl radical or a C$_7$- to C$_{12}$-arylalkyl radical. Z more preferably represents a C$_1$- to C$_4$-alkyl radical, a C$_1$- to C$_4$-haloalkyl radical, an optionally substituted phenyl radical, e.g. a tolyl radical or a xylyl radical, or an optionally substituted C$_1$- to C$_4$-alkylphenyl radical, e.g. a benzyl radical.

In a particularly preferred embodiment of the present invention, the at least one initiator used is an organic sulfonic acid selected from methanesulfonic acid, trifluoromethanesulfonic acid, trichloromethanesulfonic acid and toluenesulfonic acid, or mixtures thereof.

Suitable Lewis acids as a polymerization catalyst or in the complex effective as a polymerization catalyst are in principle all inorganic molecules identified as Lewis acids by definition, but especially halogen compounds of metals and semi metals of the Periodic Table of the Elements whose valences are fully satisfied by halogen atoms or which, in addition to the halogen substituents, also bear one or more organic carbon radicals—especially C$_1$- to C$_4$-alkyl radicals. Useful halogen substituents in these element halides and alkyl element halides here include iodine, bromine and especially fluorine and in particular chlorine. It is of course also possible to use mixtures of those element halides or of those alkyl element halides with one another in each case and also with each other.

If, for example, the halides or alkyl halides of aluminum are used as such Lewis acids, the following species can typically be used: aluminum trifluoride, aluminum trichloride, aluminum tribromide; as alkylaluminum halides, mono($C_1$- to $C_4$-alkyl)aluminum dihalides or di($C_1$- to $C_4$-alkyl)aluminum monohalide such as methylaluminum dichloride, ethylaluminum dichloride, dimethylaluminum chloride or diethylaluminum chloride.

In a preferred embodiment, the Lewis acid used for the polymerization catalyst of the complex effective as a polymerization catalyst is at least one compound selected from the binary chlorine and fluorine compounds of the elements of transition groups 1 to 8 and of main groups 3 to 5 of the Periodic Table, and the binary chlorine compounds may be preferable over the binary fluorine compounds of these elements.

Typical binary chlorine compounds of this kind are $ScCl_3$, $YCl_3$, $YbCl_3$, $TiCl_3$, $TiCl_4$, $ZrCl_4$, $HfCl_4$, $VCl_3$, $VCl_4$, $NbCl_3$, $NbCl_5$, $TaCl_5$, $CrCl_2$, $CrCl_3$, $MoCl_3$, $MoCl_5$, $WCl_5$, $WCl_6$, $MnCl_2$, $ReCl_3$, $ReCl_5$, $FeCl_2$, $FeCl_3$, $RuCl_3$, $OsCl_3$, $CoCl_2$, $CoCl_3$, $RhCl_3$, $IrCl_3$, $NiCl_2$, $PdCl_2$, $PtCl_2$, $CuCl$, $CuCl_2$, $AgCl$, $AuCl$, $ZnCl_2$, $CdCl_2$, $HgCl$, $HgCl_2$, $BCl_3$, $AlCl_3$, $GaCl_3$, $InCl_3$, $TlCl_3$, $SiCl_4$, $GeCl_4$, $SnCl_2$, $SnCl_3$, $SnCl_4$, $PbCl_2$, $PbCl_4$, $PCl_3$, $PCl_5$, $AsCl_3$, $SbCl_3$, $SbCl_5$ and $BiCl_3$. Particular preference among these is given to $BCl_3$, $AlCl_3$, $TiCl_4$, $FeCl_2$, $FeCl_3$ and $ZnCl_2$.

Typical binary fluorine compounds of this kind are $ScF_3$, $YF_3$, $YbF_3$, $TiF_3$, $TiF_4$, $ZrF_4$, $HfF_4$, $VF_3$, $VF_4$, $NbF_3$, $NbF_5$, $TaF_5$, $CrF_2$, $CrF_3$, $MoF_3$, $MoF_5$, $WF_5$, $WF_6$, $MnF_2$, $ReF_3$, $ReF_5$, $FeF_2$, $FeF_3$, $RuF_3$, $OsF_3$, $CoF_2$, $CoF_3$, $RhF_3$, $IrF_3$, $NiF_2$, $PdF_2$, $PtF_2$, $CuF$, $CuF_2$, $AgF$, $AuF$, $ZnF_2$, $CdF_2$, $HgF$, $HgF_2$, $BF_3$, $AlF_3$, $GaF_3$, $InF_3$, $TlF_3$, $SiF_4$, $GeF_4$, $SnF_2$, $SnF_3$, $SnF_4$, $PbF_2$, $PbF_4$, $PF_3$, $PF_5$, $AsF_3$, $SbF_3$, $SbF_5$ and $BiF_3$. Among these, particular preference is given to $BF_3$, $AlF_3$, $TiF_4$, $FeF_2$, $FeF_3$ and $ZnF_2$. It is also possible to use mixtures of binary chlorine and fluorine compounds.

It is often also possible to use binary bromine compounds as Lewis acids of this kind; such bromine compounds are, for example: $TiBr_3$, $TiBr_4$, $ZrBr_4$, $VBr_3$, $VBr_4$, $CrBr_2$, $CrBr_3$, $MoBr_3$, $MoBr_5$, $WBr_5$, $WBr_6$, $MnBr_2$, $FeBr_2$, $FeBr_3$, $CoBr_2$, $CoBr_3$, $NiBr_2$, $PdBr_2$, $PtBr_2$, $CuBr$, $CuBr_2$, $AgBr$, $AuBr$, $ZnBr_2$, $CdBr_2$, $HgBr$, $HgBr_2$, $BBr_3$, $AlBr_3$, $SiBr_4$, $SnBr_2$, $SnBr_3$, $SnBr_4$, $PbBr_2$, $PbBr_4$, $PBr_3$, $PBr_5$, $AsBr_3$, $SbBr_3$, $SbBr_5$ and $BiBr_3$.

Very particular preference is given to using the preferred sulfonic acid initiators methanesulfonic acid, trifluoromethanesulfonic acid, trichloromethanesulfonic acid and toluenesulfonic acid together with the preferred Lewis acids or Lewis acid complexes with $BCl_3$, $AlCl_3$, $TiCl_4$, $FeCl_2$, $FeCl_3$, $ZnCl_2$, $BF_3$, $AlF_3$, $TiF_4$, $FeF_2$, $FeF_3$ and/or $ZnF_2$, in particular methanesulfonic acid together with $AlCl_3$, $BF_3$ or $FeCl_3$, especially when Lewis acid complexes which comprise the dihydrocarbyl ethers of the general formula $R^1$—O—$R^2$ and/or hydrocarbyl carboxylates of the general formula $R^3$—COO$R^4$ specified below as preferred as donors are used.

In the process according to the invention, preference is given to using a complex which is effective as a polymerization catalyst and comprises, as the donor, an organic compound with at least one ether function or a carboxylic ester function. It is of course also possible to use mixtures of different organic compounds with at least one ether function and/or of different organic compounds with at least one carboxylic ester function. If the complex effective as a polymerization catalyst has, as a donor, an organic compound with at least one ether function, compounds with at least one ether function are also understood to mean acetals and hemiacetals.

In a preferred embodiment of the present invention, a complex which is effective as a polymerization catalyst and is formed from at least one Lewis acid and at least one donor is used, in which the organic compound which functions as the donor is a dihydrocarbyl ether of the general formula $R^1$—O—$R^2$ in which the variables $R^1$ and $R^2$ are each independently $C_1$- to $C_{20}$-alkyl radicals, especially $C_1$- to $C_8$-alkyl radicals, $C_5$- to $C_8$-cycloalkyl radicals, $C_6$- to $C_{20}$-aryl radicals, especially $C_6$- to $C_{12}$-aryl radicals, or $C_7$- to $C_{20}$-arylalkyl radicals, especially $C_7$- to $C_{12}$-arylalkyl radicals, a hydrocarbyl carboxylate of the general formula $R^3$—COO$R^4$ in which the variables $R^3$ and $R^4$ are each independently $C_1$- to $C_{20}$-alkyl radicals, especially $C_1$- to $C_8$-alkyl radicals, $C_5$- to $C_8$-cycloalkyl radicals, $C_6$- to $C_{20}$-aryl radicals, especially $C_6$- to $C_{12}$-aryl radicals, or $C_7$- to $C_{20}$-arylalkyl radicals, especially $C_7$- to $C_{12}$-arylalkyl radicals.

The dihydrocarbyl ethers mentioned may be open-chain or cyclic, where the two variables $R^1$ and $R^2$ in the case of the cyclic ethers may join to form a ring, where such rings may also comprise two or three ether oxygen atoms. Examples of such open-chain and cyclic dihydrocarbyl ethers are dimethyl ether, diethyl ether, di-n-propyl ether, diisopropyl ether, di-n-butyl ether, di-sec-butyl ether, diisobutyl ether, di-n-pentyl ether, di-n-hexyl ether, di-n-heptyl ether, di-n-octyl ether, di-(2-ethylhexyl)ether, methyl n-butyl ether, methyl sec-butyl ether, methyl isobutyl ether, methyl tert-butyl ether, ethyl n-butyl ether, ethyl sec-butyl ether, ethyl isobutyl ether, n-propyl n-butyl ether, n-propyl sec-butyl ether, n-propyl isobutyl ether, n-propyl tert-butyl ether, isopropyl n-butyl ether, isopropyl sec-butyl ether, isopropyl isobutyl ether, isopropyl tert-butyl ether, methyl n-hexyl ether, methyl n-octyl ether, methyl 2-ethylhexyl ether, ethyl n-hexyl ether, ethyl n-octyl ether, ethyl 2-ethylhexyl ether, n-butyl n-octyl ether, n-butyl 2-ethylhexyl ether, tetrahydrofuran, tetrahydropyran, 1,2-, 1,3- and 1,4-dioxane, dicyclohexyl ether, diphenyl ether, ditolyl ether, dixylyl ether and dibenzyl ether. Among the dihydrocarbyl ethers mentioned, di-n-butyl ether and diphenyl ether have been found to be particularly advantageous here as donors, especially in combination with the Lewis acids $BCl_3$, $AlCl_3$, $TiCl4$, $FeCl2$, $FeCl_3$ and $ZnCl_2$.

Examples of the hydrocarbyl carboxylates mentioned are methyl formate, ethyl formate, n-propyl formate, isopropyl formate, n-butyl formate, sec-butyl formate, isobutyl formate, tert-butyl formate, methyl acetate, ethyl acetate, n-propyl acetate, isopropyl acetate, n-butyl acetate, sec-butyl acetate, isobutyl acetate, tert-butyl acetate, methyl propionate, ethyl propionate, n-propyl propionate, isopropyl propionate, n-butyl propionate, sec-butyl propionate, isobutyl propionate, tert-butyl propionate, methyl butyrate, ethyl butyrate, n-propyl butyrate, isopropyl butyrate, n-butyl butyrate, sec-butyl butyrate, isobutyl butyrate, tert-butyl butyrate, methyl cyclohexanecarboxylate, ethyl cyclohexanecarboxylate, n-propyl cyclohexanecarboxylate, isopropyl cyclohexanecarboxylate, n-butyl cyclohexanecarboxylate, sec-butyl cyclohexanecarboxylate, isobutyl cyclohexanecarboxylate, tert-butyl cyclohexanecarboxylate, methyl benzoate, ethyl benzoate, n-propyl benzoate, isopropyl benzoate, n-butyl benzoate, sec-butyl benzoate, isobutyl benzoate, tert-butyl benzoate, methyl phenylacetate, ethyl phenylacetate, n-propyl phenylacetate, isopropyl phenylacetate, n-butyl phenylacetate, sec-butyl phenylacetate, isobutyl phenylacetate and tert-butyl phenylacetate. Among the hydrocarbyl carboxylates mentioned, ethyl acetate has been found to be particularly advantageous here as a donor, especially in combination with the Lewis acids $BCl_3$, $AlCl_3$, $TiCl_4$, $FeCl_2$, $FeCl_3$ and $ZnCl_2$.

In addition, dihydrocarbyl ethers and hydrocarbyl carboxylates particularly advantageous as donors, especially in combination with the Lewis acids $BCl_3$, $AlCl_3$, $TiCl_4$, $FeCl_2$, $FeCl_3$ and $ZnCl_2$, have been found to be those in which the donor compound has a total carbon number of 3 to 16, preferably of 4 to 16, especially of 4 to 12, in particular of 4 to 8. In the specific case of the dihydrocarbyl ethers, preference is given in particular to those having a total of 6 to 14 and especially 8 to 12 carbon atoms. In the specific case of the hydrocarbyl carboxylates, preference is given in particular to those having a total of 3 to 10 and especially 4 to 6 carbon atoms.

The molar ratio of the donor compounds mentioned to the Lewis acids, i.e. especially to the element halides and alkyl element halides mentioned, especially to the Lewis acids $BCl_3$, $AlCl_3$, $TiCl_4$, $FeCl_2$, $FeCl_3$ and $ZnCl_2$, in the complex effective as a polymerization catalyst, generally varies within the range from 0.3:1 to 1.5:1, especially from 0.5:1 to 1.2:1, in particular 0.7:1 to 1.1:1; in most cases it is 1:1. However, it is also possible to work with a greater excess of the donor compounds, often up to a 10-fold and especially 3-fold molar excess; the excess amount of donor compounds then acts additionally as a solvent or diluent.

Typically, the complex effective as a polymerization catalyst is prepared before the polymerization separately from the Lewis acid(s) mentioned, which is/are generally used in anhydrous form, and the donor compound(s), and is then—usually dissolved in an inert solvent such as a halogenated hydrocarbon, for example dichloromethane—added to the polymerization medium. However, the complex can also be prepared in situ prior to the polymerization.

In a preferred embodiment of the present invention, the polymerization is performed with additional use of at least one further initiator which is mono- or polyfunctional, especially mono-, di- or trifunctional, and is selected from organic hydroxyl compounds, organic halogen compounds, protic acids and water. It is also possible to use mixtures of such further initiators, for example mixtures of two or more organic hydroxyl compounds, mixtures of two or more organic halogen compounds, mixtures of one or more organic hydroxyl compounds and one or more organic halogen compounds, mixtures of one or more organic hydroxyl compounds and water, mixtures of one or more organic halogen compounds and water or mixtures of one or more protic acids and water. The initiator may be mono-, di- or polyfunctional, i.e. one, two or more hydroxyl groups or halogen atoms, which start the polymerization reaction, may be present in the initiator molecule. In the case of di- or polyfunctional initiators, telechelic isobutene polymers with two or more, especially two or three, polyisobutene chain ends are typically obtained.

Organic hydroxyl compounds which have only one hydroxyl group in the molecule and are suitable as monofunctional initiators include especially alcohols and phenols, in particular those of the general formula $R^5$—OH, in which $R^5$ denotes $C_1$- to $C_{20}$-alkyl radicals, especially $C_1$- to $C_8$-alkyl radicals, $C_5$- to $C_8$-cycloalkyl radicals, $C_6$- to $C_{20}$-aryl radicals, especially $C_6$- to $C_{12}$-aryl radicals, or $C_7$- to $C_{20}$-arylalkyl radicals, especially $C_7$- to $C_{12}$-arylalkyl radicals. In addition, the $R^5$ radicals may also comprise mixtures of the abovementioned structures and/or have other functional groups than those already mentioned, for example a keto function, a nitroxide or a carboxyl group, and/or heterocyclic structural elements.

Typical examples of such organic monohydroxyl compounds are methanol, ethanol, n-propanol, isopropanol, n-butanol, sec-butanol, isobutanol, tert-butanol, n-pentanol, n-hexanol, n-heptanol, n-octanol, 2-ethylhexanol, cyclohexanol, phenol, p-methoxyphenol, o-, m- and p-cresol, benzyl alcohol, p-methoxybenzyl alcohol, 1- and 2-phenylethanol, 1- and 2-(p-methoxyphenyl)ethanol, 1-, 2- and 3-phenyl-1-propanol, 1-, 2- and 3-(p-methoxyphenyl)-1-propanol, 1- and 2-phenyl-2-propanol, 1- and 2-(p-methoxyphenyl)-2-propanol, 1-, 2-, 3- and 4-phenyl-1-butanol, 1-, 2-, 3- and 4-(p-methoxyphenyl)-1-butanol, 1-, 2-, 3- and 4-phenyl-2-butanol, 1-, 2-, 3- and 4-(p-methoxyphenyl)-2-butanol, 9-methyl-9H-fluoren-9-ol, 1,1-diphenylethanol, 1,1-diphenyl-2-propyn-1-ol, 1,1-diphenylpropanol, 4-(1-hydroxy-1-phenylethyl)benzonitrile, cyclopropyldiphenylmethanol, 1-hydroxy-1,1-diphenylpropan-2-one, benzilic acid, 9-phenyl-9-fluorenol, triphenylmethanol, diphenyl(4-pyridinyl)methanol, alpha,alphadiphenyl-2-pyridinemethanol, 4-methoxytrityl alcohol (especially polymer-bound as a solid phase), alpha-tert-butyl-4-chloro-4'-methylbenzhydrol, cyclohexyldiphenylmethanol, alpha-(p-tolyl)-benzhydrol, 1,1,2-triphenylethanol, alpha,alpha-diphenyl-2-pyridineethanol, alpha,alpha-4-pyridylbenzhydrol N-oxide, 2-fluorotriphenylmethanol, triphenylpropargyl alcohol, 4-[(diphenyl)hydroxymethyl]benzonitrile, dimethoxyphenyl)-2-methyl-1-phenyl-1-propanol, 1,1,2-triphenylpropan-1-ol and p-anisaldehyde carbinol.

Organic hydroxyl compounds which have two hydroxyl groups in the molecule and are suitable as bifunctional initiators are especially dihydric alcohols or diols having a total carbon number of 2 to 30, especially of 3 to 24, in particular of 4 to 20, and bisphenols having a total carbon number of 6 to 30, especially of 8 to 24, in particular of 10 to 20, for example ethylene glycol, 1,2- and 1,3-propylene glycol, 1,4-butylene glycol, 1,6-hexylene glycol, 1,2-, 1,3- or 1,4-bis(1-hydroxy-1-methylethyl)benzene (o-, m- or p-dicumyl alcohol), bisphenol A, 9,10-di-hydro-9,10-dimethyl-9,10-anthracenediol, 1,1-diphenylbutane-1,4-diol, 2-hydroxytriphenylcarbinol and 9-[2-(hydroxymethyl)-phenyl]-9-fluorenol.

Organic halogen compounds which have one halogen atom in the molecule and are suitable as monofunctional initiators are in particular compounds of the general formula $R^6$-Hal in which Hal is a halogen atom selected from fluorine, iodine and especially chlorine and bromine, and $R^6$ denotes $C_1$- to $C_{20}$-alkyl radicals, especially $C_1$- to $C_8$-alkyl radicals, $C_5$- to $C_8$-cycloalkyl radicals or $C_7$- to $C_{20}$-arylalkyl radicals, especially $C_7$- to $C_{12}$-arylalkyl radicals. In addition, the $R^6$ radicals may also comprise mixtures of the abovementioned structures and/or have other functional groups than those already mentioned, for example a keto function, a nitroxide or a carboxyl group, and/or heterocyclic structural elements.

Typical examples of such monohalogen compounds are methyl chloride, methyl bromide, ethyl chloride, ethyl bromide, 1-chloropropane, 1-bromopropane, 2-chloropropane, 2-bromopropane, 1-chlorobutane, 1-bromobutane, sec-butyl chloride, sec-butyl bromide, isobutyl chloride, isobutyl bromide, tert-butyl chloride, tert-butyl bromide, 1-chloropentane, 1-bromopentane, 1-chlorohexane, 1-bromohexane, 1-chloroheptane, 1-bromoheptane, 1-chlorooctane, 1-bromooctane, 1-chloro-2-ethylhexane, 1-bromo-2-ethylhexane, cyclohexyl chloride, cyclohexyl bromide, benzyl chloride, benzyl bromide, 1-phenyl-1-chloroethane, 1-phenyl-1-bromoethane, 1-phenyl-2-chloroethane, 1-phenyl-2-bromoethane, 1-phenyl-1-chloropropane, 1-phenyl-1-bromopropane, 1-phenyl-2-chloropropane, 1-phenyl-2-bromopropane, 2-phenyl-2-chloropropane, 2-phenyl-2-bromopropane, 1-phenyl-3-chloropropane, 1-phenyl-3-bromopropane, 1-phenyl-1-chlorobutane, 1-phenyl-1-bromobutane, 1-phenyl-2-chlorobutane, 1-phenyl-2-bromobutane, 1-phenyl-3- chlorobutane, 1-phenyl-3-bromobutane, 1-phenyl-4-chlorobutane, 1-phenyl-4-bromobutane, 2-phenyl-1-chlorobutane, 2-phenyl-1-bromobutane, 2-phenyl-2-chlorobutane, 2-phenyl-2-bromobutane, 2-phenyl-3-chlorobutane, 2-phenyl-3-bromobutane, 2-phenyl-4-chlorobutane and 2-phenyl-4-bromobutane.

Organic halogen compounds which have two halogen atoms in the molecule and are suitable as difunctional initiators are, for example, 1,3-bis(1-bromo-1-methylethyl)-benzene, 1,3-bis(2-chloro-2-propyl)benzene(1,3-dicumyl chloride) and 1,4-bis(2-chloro-2-propyl)benzene(1,4-dicumyl chloride).

The further initiator is more preferably selected from organic hydroxyl compounds in which one or more hydroxyl groups are each bonded to an $sp^3$-hybridized carbon atom ("alcohols") or to an aromatic ring ("phenols"), organic halogen compounds in which one or more halogen atoms are each bonded to an $sp^3$-hybridized carbon atom, protic acids and water. Among these, preference is given especially to an initiator selected from organic hydroxyl compounds in which one or more hydroxyl groups are each bonded to an $sp^3$-hybridized carbon atom.

In the case of the organic halogen compounds, particularly preferred further initiators are additionally those in which the one or more halogen atoms are each bonded to a secondary or especially to a tertiary $sp^3$-hybridized carbon atom.

Preference is given in particular to further initiators which bear, on such an $sp^3$-hybridized carbon atom, in addition to the hydroxyl group, the $R^5$, $R^6$ and $R^7$ radicals which are each independently hydrogen, $C_1$- to $C_{20}$-alkyl, $C_5$- to $C_8$-cycloalkyl, $C_6$- to $C_{20}$-aryl, $C_7$- to $C_{20}$-alkylaryl or phenyl, where any aromatic ring may also bear one or more, preferably one or two, $C_1$- to $C_4$-alkyl, $C_1$- to $C_4$-alkoxy, $C_1$- to $C_4$-hydroxyalkyl or $C_1$- to $C_4$-haloalkyl radicals as substituents, where at most one of the variables $R^5$, $R^6$ and $R^7$ is hydrogen and at least one of the variables $R^5$, $R^6$ and $R^7$ is phenyl which may also bear one or more, preferably one or two, $C_1$- to $C_4$-alkyl, $C_1$- to $C_4$-alkoxy, $C_1$- to $C_4$-hydroxyalkyl or $C_1$- to $C_4$-haloalkyl radicals as substituents.

Examples of useful protic acids include hydrochloric acid, hydrobromic acid, hydrofluoric acid, sulfuric acid, hydrocyanic acid and mixtures thereof. However, the protic acids used may also be protonated ethers.

For the present invention, very particular preference is given to further initiators selected from water, one or more protic acids, methanol, ethanol, 1-phenylethanol, 1-(p-methoxyphenyl)ethanol, n-propanol, isopropanol, 2-phenyl-2-propanol(cumene), n-butanol, isobutanol, sec-butanol, tert-butanol, 1-phenyl-1-chloroethane, 2-phenyl-2-chloropropane (cumyl chloride), tert-butyl chloride and 1,3- or 1,4-bis(1-hydroxy-1-methylethyl)benzene, and mixtures thereof. Among these, preference is given especially to further initiators selected from water, one or more protic acids, methanol, ethanol, 1-phenylethanol, 1-(p-methoxyphenyl) ethanol, n-propanol, isopropanol, 2-phenyl-2-propanol (cumene), n-butanol, isobutanol, sec-butanol, tert-butanol, 1-phenyl-1-chloroethane and 1,3- or 1,4-bis(1-hydroxy-1-methylethyl)benzene, and mixtures thereof.

The molar ratio of the sum of the organic sulfonic acids of the general formula Z—$SO_3H$ used in accordance with the invention and of any further initiators to be used among those mentioned to the isobutene monomer used in the case of homopolymerization of isobutene, or to the total amount of the polymerizable monomers used in the case of copolymerization of isobutene, based on each individual functional site of the initiator (the organic sulfonic acids should be considered as monofunctional), is generally 0.001:1 to 0.5:1, especially 0.01:1 to 0.4:1, in particular 01:1 to 0.3:1. In the case of use of water as the sole further initiator or in combination with organic hydroxyl compounds and/or organic halogen compounds as further initiators, the molar ratio of water alone to the isobutene monomer used in the case of homopolymerization of isobutene, or to the total amount of polymerizable monomers used in the case of copolymerization of isobutene, is especially 0.0001:1 to 0.1:1, in particular 0.0002:1 to 0.05:1.

A proportion of the initiator molecules added as organic sulfonic acids and optionally as organic hydroxyl or halogen compounds may be incorporated into the polymer chains. The proportion ($I_{eff}$) of polymer chains which are started by such an incorporated organic initiator molecule may be up to 100%, is generally 0 to 90% and may be 5 to 90%. The remaining polymer chains arise either from water originating from traces of moisture as an initiator molecule, or from chain transfer reactions.

In a further preferred embodiment of the present invention, the polymerization is performed in the presence of 0.01 to 10 mmol, especially of 0.05 to 5.0 mmol, in particular of 0.1 to 1.0 mmol, based in each case on 1 mol of isobutene monomer used in the case of homopolymerization of isobutene, or on 1 mol of the total amount of the polymerizable monomers used in the case of copolymerization of isobutene, of a nitrogen-containing basic compound.

Such a nitrogen-containing basic compound used may be an aliphatic, cycloaliphatic or aromatic amine of the general formula $R^7$—$NR^8R^9$, or else ammonia, in which the variables $R^7$, $R^8$ and $R^9$ are each independently hydrogen, $C_1$- to $C_{20}$-alkyl radicals, especially $C_1$- to $C_8$-alkyl radicals, $C_5$- to $C_8$-cycloalkyl radicals, $C_6$- to $C_{20}$-aryl radicals, especially $C_6$- to $C_{12}$-aryl radicals, or $C_7$- to $C_{20}$-arylalkyl radicals, especially $C_7$- to $C_{12}$-arylalkyl radicals. When none of these variables is hydrogen, the amine is a tertiary amine. When one of these variables is hydrogen, the amine is a secondary amine. When two of these variables is hydrogen, the amine is a primary amine. When all these variables are hydrogen, the amine is ammonia.

Typical examples of such amines of the general formula $R^7$—$NR^8R^9$ are methylamine, ethylamine, n-propylamine, isopropylamine, n-butylamine, tert-butylamine, sec-butylamine, isobutylamine, tert-amylamine, n-hexylamine, n-heptylamine, n-octylamine, 2-ethylhexylamine, cyclopentylamine, cyclohexylamine, aniline, dimethylamine, diethylamine, di-n-propylamine, diisopropylamine, di-n-butylamine, di-tert-butylamine, di-sec-butylamine, diisobutylamine, di-tert-amylamine, di-n-hexylamine, di-n-heptylamine, di-n-octylamine, di-(2-ethylhexyl)amine, dicyclopentylamine, dicyclohexylamine, diphenylamine, trimethylamine, triethylamine, tri-n-propylamine, tri-isopropylamine, tri-n-butylamine, tri-tert-butylamine, tri-sec-butylamine, tri-isobutylamine, tri-tert-amylamine, tri-n-hexylamine, tri-n-heptylamine, tri-n-octylamine, tri-(2-ethylhexyl)amine, tricyclopentylamine, tricyclohexylamine, triphenylamine, dimethylethylamine, methyl-n-butylamine, N-methyl-N-phenylamine, N,N-dimethyl-N-phenylamine, N-methyl-N,N-diphenylamine or N-methyl-N-ethyl-N-n-butylamine.

In addition, such a nitrogen-containing basic compound used may also be a compound having a plurality of, especially having two or three, nitrogen atoms and having 2 to 20 carbon atoms, where these nitrogens may each independently bear hydrogen atoms or aliphatic, cycloaliphatic or aromatic substituents. Examples of such polyamines are 1,2-ethylenediamine, 1,3-propylenediamine, 1,4-butylenediamine, diethylenetriamine, N-methyl-1,2-ethylenediamine, N,N-dimethyl- 1,2-ethylenediamine, N,N'-dimethyl-1,2-ethylenediamine or N,N-dimethyl-1,3-propylenediamine.

However, a suitable nitrogen-containing basic compound of this kind is especially a saturated, partly unsaturated or unsaturated nitrogen-containing five-membered or six-membered heterocyclic ring which comprises one, two or three ring nitrogen atoms and may have one or two further ring heteroatoms from the group of oxygen and sulfur and/or hydrocarbyl radicals, especially $C_1$- to $C_4$-alkyl radicals and/or phenyl, and/or functional groups or heteroatoms as substituents, especially fluorine, chlorine, bromine, nitro and/or cyano, for example pyrrolidine, pyrrole, imidazole, 1,2,3- or 1,2,4-triazole, oxazole, thiazole, piperidine, pyrazane, pyrazole, pyridazine, pyrimidine, pyrazine, 1,2,3-, 1,2,4- or 1,2, 5-triazine, 1,2,5-oxathiazine, 2H-1,3,5-thiadiazine or morpholine.

However, a very particularly suitable nitrogen-containing basic compound of this kind is pyridine or a derivative of pyridine (especially a mono-, di- or tri-$C_1$- to $C_4$-alkyl-substituted pyridine) such as 2-, 3-, or 4-methylpyridine(picolines), 2,3-, 2,4-, 2,5-, 2,6-, 3,4-, 3,5- or 3,6-dimethylpyridine(lutidines), 2,4,6-trimethylpyridine(collidine), 2-, 3,- or 4-tert-butylpyridine, 2-tert-butyl-6-methylpyridine, 2,4-, 2,5-, 2,6- or 3,5-di-tert-butylpyridine or else 2-, 3,- or 4-phenylpyridine.

It is possible to use a single nitrogen-containing basic compound or mixtures of such nitrogen-containing basic compounds.

For the use of isobutene or of an isobutene-comprising monomer mixture as the monomer to be polymerized, suitable isobutene sources are both pure isobutene and isobutenic $C_4$ hydrocarbon streams, for example $C_4$ raffinates, especially "raffinate 1", $C_4$ cuts from isobutane dehydrogenation, $C_4$ cuts from steam crackers and from FCC crackers (fluid catalyzed cracking), provided that they have been substantially freed of 1,3-butadiene present therein. A $C_4$ hydrocarbon stream from an FCC refinery unit is also known as a "b/b" stream. Further suitable isobutenic $C_4$ hydrocarbon streams are, for example, the product stream of a propylene-isobutane cooxidation or the product stream from a metathesis unit, which are generally used after customary purification and/or concentration. Suitable $C_4$ hydrocarbon streams generally comprise less than 500 ppm, preferably less than 200 ppm, of butadiene. The presence of 1-butene and of cis- and trans-2-butene is substantially uncritical. Typically, the isobutene concentration in the $C_4$ hydrocarbon streams mentioned is in the range from 40 to 60% by weight. For instance, raffinate 1 generally consists essentially of 30 to 50% by weight of isobutene, 10 to 50% by weight of 1-butene, 10 to 40% by weight of cis- and trans-2-butene, and 2 to 35% by weight of butanes; in the polymerization process according to the invention, the unbranched butenes in the raffinate 1 generally behave virtually inertly, and only the isobutene is polymerized.

In a preferred embodiment, the monomer source used for the polymerization is a technical $C_4$ hydrocarbon stream with an isobutene content of 1 to 100% by weight, especially of 1 to 99% by weight, in particular of 1 to 90% by weight, more preferably of 30 to 60% by weight, especially a raffinate 1 stream, a b/b stream from an FCC refinery unit, a product stream of a propylene-isobutane cooxidation or a product stream from a metathesis unit.

Especially in the case of use of a raffinate 1 stream as the isobutene source, the use of water as the sole further initiator, or together with further initiator selected from organic hydroxyl compounds and organic halogen compounds, has been found to be useful, in particular when polymerization is effected at temperatures of −30° C. to +50° C., especially of 0° C. to +30° C.

The isobutenic monomer mixture mentioned may comprise small amounts of contaminants such as water, carboxylic acids or mineral acids, without there being any critical yield or selectivity losses. It is appropriate to prevent enrichment of these impurities by removing such harmful substances from the isobutenic monomer mixture, for example by adsorption on solid adsorbents such as activated carbon, molecular sieves or ion exchangers.

It is also possible to convert monomer mixtures of isobutene or of the isobutenic hydrocarbon mixture with olefinically unsaturated monomers copolymerizable with isobutene. When monomer mixtures of isobutene are to be copolymerized with suitable comonomers, the monomer mixture preferably comprises at least 5% by weight, more preferably at least 10% by weight and especially at least 20% by weight of isobutene, and preferably at most 95% by weight, more preferably at most 90% by weight and especially at most 80% by weight of comonomers.

Useful copolymerizable monomers include: vinylaromatics such as styrene and α-methylstyrene, $C_1$- to $C_4$-alkylstyrenes such as 2-, 3- and 4-methylstyrene, and 4-tert-butylstyrene, halostyrenes such as 2-, 3- or 4-chiorostyrene, and isoolefins having 5 to 10 carbon atoms, such as 2-methylbutene-1, 2-methyl-pentene-1, 2-methylhexene-1, 2-ethylpentene-1, 2-ethylhexene-1 and 2-propylheptene-1. Further useful comonomers include olefins which have a silyl group, such as 1-tri-methoxysilylethene, 1-(trimethoxysilyl)propene, 1-(trimethoxysilyl)-2-methylpropene-2, 1-[tri(methoxyethoxy)silyl]ethene, 1-[tri(methoxyethoxy)silyl]propene, and 1-[tri-(methoxyethoxy)silyl]-2-methylpropene-2. In addition—depending on the polymerization conditions—useful comonomers also include isoprene, 1-butene and cis- and trans-2-butene.

When the process according to the invention is to be used to prepare copolymers, the process can be configured so as to preferentially form random polymers or to preferentially form block copolymers. To prepare block copolymers, for example, the different monomers can be supplied successively to the polymerization reaction, in which case the second comonomer is especially not added until the first comonomer is already at least partly polymerized. In this manner, diblock, triblock and higher block copolymers are obtainable, which, according to the sequence of monomer addition, have a block of one or the other comonomer as a terminal block. In some cases, however, block copolymers also form when all comonomers are supplied to the polymerization reaction simultaneously, but one of them polymerizes significantly more rapidly than the other(s). This is the case especially when isobutene and a vinylaromatic compound, especially styrene, are copolymerized in the process according to the invention. This preferably forms block copolymers with a terminal polystyrene block. This is attributable to the fact that the vinylaromatic compound, especially styrene, polymerizes significantly more slowly than isobutene.

The polymerization can be effected either continuously or batchwise. Continuous processes can be performed in analogy to known prior art processes for continuous polymerization of isobutene in the presence of boron trifluoride-based catalysts in the liquid phase.

The process according to the invention is suitable either for performance at low temperatures, e.g. at −90° C. to 0° C., or else especially at higher temperatures, i.e. at at least 0° C., e.g. at 0° C. to +50° C. or at 0° C. to +30° C. The polymerization in the process according to the invention is, however, preferably performed at a temperature of −30° C. to +50° C., especially at 0° C. to +30° C., for example at room temperature (+20 to +25° C.).

When the polymerization in the process according to the invention is effected at or above the boiling temperature of the monomer or monomer mixture to be polymerized, it is preferably performed in pressure vessels, for example in autoclaves or in pressure reactors.

The polymerization in the process according to the invention is preferably performed in the presence of an inert diluent. The inert diluent used should be suitable for reducing the increase in the viscosity of the reaction solution which generally occurs during the polymerization reaction to such an extent that the removal of the heat of reaction which evolves can be ensured. Suitable diluents are those solvents or solvent mixtures which are inert toward the reagents used. Suitable diluents are, for example, aliphatic hydrocarbons such as n-butane, n-pentane, n-hexane, n-heptane, n-octane and isooctane, cycloaliphatic hydrocarbons such as cyclopentane and cyclohexane, aromatic hydrocarbons such as benzene, toluene and the xylenes, and halogenated hydrocarbons, especially halogenated aliphatic hydrocarbons, such as methyl chloride, dichloromethane and trichloromethane (chloroform), 1,1-dichloroethane, 1,2-dichloroethane, trichloroethane and 1-chlorobutane, and also halogenated aromatic hydrocarbons and alkylaromatics halogenated in the alkyl side chains, such as chlorobenzene, monofluoromethylbenzene, difluoromethylbenzene and trifluoromethylbenzene, and mixtures of the aforementioned diluents. Preferred halogenated hydrocarbons for the inert diluents mentioned above and below are chlorinated hydrocarbons, especially pure chlorohydrocarbons. Fluorohydrocarbons are preferably excluded from the inert diluents usable here in order to very substantiably rule out residual contents of fluorine in the polymer. The diluents used, or the constituents used in the solvent mixtures mentioned, are also the inert components of isobutenic $C_4$ hydrocarbon streams.

The inventive polymerization is preferably performed in an aliphatic, cycloaliphatic or aromatic hydrocarbon, in a halogenated hydrocarbon, especially in a halogenated aliphatic hydrocarbon, or in a mixture of aliphatic, cycloaliphatic and/or aromatic hydrocarbons or of halogenated hydrocarbons, especially of halogenated aliphatic hydrocarbons, or in a mixture of at least one halogenated hydrocarbon, especially a halogenated aliphatic hydrocarbon, and at least one aliphatic, cycloaliphatic or aromatic hydrocarbon as an inert diluent, for example a mixture of dichloromethane and n-hexane, typically in a volume ratio of 10:90 to 90:10, especially of 50:50 to 85:15. Prior to use, the diluents are preferably freed of impurities such as water, carboxylic acids or mineral acids, for example by adsorption on solid adsorbents such as activated carbon, molecular sieves or ion exchangers.

In a further preferred embodiment, the inventive polymerization is performed in halogen-free aliphatic or especially halogen-free aromatic hydrocarbons, especially toluene. For this embodiment, water has been found to be particularly advantageous as a further initiator, optionally in combination with the organic hydroxyl compounds mentioned and/or the organic halogen compounds mentioned.

The polymerization in the process according to the invention is preferably performed under substantially aprotic and especially under substantially anhydrous reaction conditions. Substantially aprotic and substantially anhydrous reaction conditions are understood to mean that, respectively, the content of protic impurities and the water content in the reaction mixture are less than 50 ppm and especially less than 5 ppm. In general, the feedstocks will therefore be dried before use by physical and/or chemical measures. More particularly, it has been found to be useful to admix the aliphatic or cycloaliphatic hydrocarbons used as solvents, after customary prepurification and predrying with an organometallic compound, for example an organolithium, organomagnesium or organoaluminum compound, in an amount which is sufficient to substantially remove the water traces from the solvent. The solvent thus treated is then preferably condensed directly into the reaction vessel. It is also possible to proceed in a similar manner with the monomers to be polymerized, especially with isobutene or with the isobutenic mixtures. Drying with other customary desiccants such as molecular sieves or predried oxides such as aluminum oxide, silicon dioxide, calcium oxide or barium oxide is also suitable. The halogenated solvents for which drying with metals such as sodium or potassium or with metal alkyls is not an option are freed of water or water traces with desiccants suitable for that purpose, for example with calcium chloride, phosphorus pentoxide or molecular sieves. It is also possible in an analogous manner to dry those feedstocks for which treatment with metal alkyls is likewise not an option, for example vinylaromatic compounds. Even when water is used as an initiator, residual moisture should preferably be very substantially or completely removed from solvents and monomers before reaction by drying, in order to be able use the further water initiator in a controlled manner in a specified amount, as a result of which higher process control and reproducibility of the results are obtained.

The polymerization of the isobutene or of the isobutenic starting material generally proceeds spontaneously when the complex effective as a polymerization catalyst is contacted with the isobutene or the isobutenic monomer mixture at the desired reaction temperature. The procedure here may be to initially charge the monomers, optionally in the diluent, to bring it to reaction temperature and then to add the complex. The procedure may also be to initially charge the complex, optionally in the diluent, and then to add the monomers. In that case, the start of polymerization is considered to be that time at which all reactants are present in the reaction vessel.

To prepare isobutene copolymers, the procedure may be to initially charge the monomers, optionally in the diluent, and then to add the complex. The reaction temperature can be established before or after the addition of the complex. The procedure may also be first to initially charge only one of the monomers, optionally in the diluent, then to add the complex, and to add the further monomer(s) only after a certain time, for example when at least 60%, at least 80% or at least 90% of the monomer has been converted. Alternatively, the complex can be initially charged, optionally in the diluent, then the monomers can be added simultaneously or successively, and then the desired reaction temperature can be established. In that case, the start of polymerization is considered to be that time at which the complex and at least one of the monomers are present in the reaction vessel.

In addition to the batchwise procedure described here, the polymerization in the process according to the invention can also be configured as a continuous process. In this case, the feedstocks, i.e. the monomer(s) to be polymerized, optionally the diluent and optionally the complex effective as a polymerization catalyst, are supplied continuously to the polymerization reaction, and reaction product is withdrawn continuously, such that more or less steady-state polymerization conditions are established in the reactor. The monomer(s) to be polymerized can be supplied as such, diluted with a diluent or solvent, or as a monomer-containing hydrocarbon stream.

The complex effective as a polymerization catalyst is generally present in dissolved, dispersed or suspended form in the polymerization medium. Supporting of the complex, on customary support materials is also possible. Suitable reactor types for the polymerization process of the present invention are typically stirred tank reactors, loop reactors and tubular reactors, but also fluidized bed reactors, stirred tank reactors with or without solvent, fluid bed reactors, continuous fixed bed reactors and batchwise fixed bed reactors (batchwise mode).

In the process according to the invention, the complex effective as a polymerization catalyst is generally used in such an amount that the molar ratio of element in the element halides or alkyl element halides used with preference as Lewis acids to isobutene in the case of homopolymerization of isobutene, or to the total amount of the polymerizable monomers used in the case of copolymerization of isobutene, is in the range from 1:5 to 1:5000, preferably 1:10 to 1:5000, especially 1:15 to 1:1000, in particular 1:20 to 1:250.

To stop the reaction, the reaction mixture is preferably deactivated, for example by adding a protic compound, especially by adding water, alcohols such as methanol, ethanol, n-propanol and isopropanol or mixtures thereof with water, or by adding an aqueous base, for example an aqueous solution of an alkali metal or alkaline earth metal hydroxide such as sodium hydroxide, potassium hydroxide, magnesium hydroxide or calcium hydroxide, an alkali metal or alkaline earth metal carbonate such as sodium, potassium, magnesium or calcium carbonate, or an alkali metal or alkaline earth metal hydrogencarbonate such as sodium, potassium, magnesium or calcium hydrogencarbonate.

The process according to the invention serves to prepare high-reactivity isobutene homo- or copolymers with a content of terminal vinylidene double bonds (α-double bonds) per polyisobutene chain end of at least 50 mol %, preferably of at least 60 mol %, preferably of at least 70 mol %, preferably of at least 80 mol %, preferably of at least 85 mol %, more preferably of at least 90 mol %, more preferably of more than 91 mol % and especially of at least 95 mol %, for example of virtually 100 mol %. More particularly, it also serves to prepare high-reactivity isobutene copolymers which are formed from isobutene and at least one vinylaromatic monomer, especially styrene, and have a content of terminal vinylidene double bonds (α-double bonds) per polyisobutene chain end of at least 50 mol %, preferably of at least 60 mol %, preferably of at least 70 mol %, preferably of at least 80 mol %, preferably of at least 85 mol %, more preferably of at least 90 mol %, more preferably of more than 91 mol % and especially of at least 95 mol %, for example of virtually 100 mol %. To prepare such copolymers of isobutene and at least one vinylaromatic monomer, especially styrene, isobutene or an isobutenic hydrocarbon cut is copolymerized with the at least one vinylaromatic monomer in a weight ratio of isobutene to vinylaromatic of 5:95 to 95:5, especially of 30:70 to 70:30.

The high-reactivity isobutene homo- or copolymers prepared by the process according to the invention and specifically the isobutene homopolymers preferably have a polydispersity (PDI=$M_w/M_n$) of 1.05 to less than 3.5, preferably of 1.05 to less than 3.0, preferably of 1.05 to less than 2.5, preferably of 1.05 to 2.3, more preferably of 1.05 to 2.0 and especially of 1.1 to 1.85. Typical PDI values in the case of an optimal process regime are 1.2 to 1.7.

The high-reactivity isobutene homo- or copolymers prepared by the process according to the invention preferably possess a number-average molecular weight $M_n$ (determined by gel permeation chromatography) of preferably 500 to 250 000, more preferably of 500 to 100 000, even more preferably of 500 to 25 000 and especially of 500 to 5000. Isobutene homopolymers even more preferably possess a number-average molecular weight $M_n$ of 500 to 10 000 and especially of 500 to 5000, for example of about 1000 or of about 2300.

The isobutene polymers which have terminal vinylidene double bonds, comprise the organic sulfonic acids used as initiator molecules in incorporated form and occur as the predominant component in the isobutene homopolymers prepared in accordance with the invention are novel compounds. Therefore, the present invention also provides isobutene polymers of the general formula I

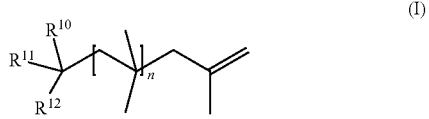

(I)

in which
$R^{10}$ is a sulfo moiety of the general formula —O—$SO_2Z$, in which the variable Z denotes a $C_1$- to $C_{20}$-alkyl radical, $C_1$- to $C_{20}$-haloalkyl radical, $C_5$- to $C_8$-cycloalkyl radical, $C_6$- to $C_{20}$-aryl radical or a $C_7$- to $C_{20}$-arylalkyl radical, and $R^{11}$ and $R^{12}$ are each independently hydrogen, $C_1$- to $C_{20}$-alkyl radicals, $C_5$- to $C_8$-cycloalkyl radicals, $C_6$- to $C_{20}$-aryl radicals or $C_7$- to $C_{20}$-alkylaryl radicals, and
n is a number from 9 to 4500.

In a preferred embodiment, $R^{11}$ and $R^{12}$ are each independently hydrogen, $C_1$- to $C_4$-alkyl, especially methyl, ethyl, n-propyl, isopropyl, n-butyl, isobutyl, sec-butyl or tert-butyl, or phenyl which may also bear one or two $C_1$- to $C_4$-alkyl or $C_1$- to $C_4$-alkoxy radicals as substituents, and n is a number from 9 to 4500, preferably 9 to 180, especially 9 to 90, in particular 15 to 45.

The process according to the invention successfully polymerizes isobutene or isobutene-comprising monomer mixtures under cationic conditions with satisfactory to high conversions of generally 20 to 100%, especially 35 to 90%, in short reaction times of generally 5 to 120 minutes, especially 5 to 60 minutes, to give high-reactivity isobutene homo- or copolymers with a content of terminal vinylidene double bonds per polyisobutene chain end in almost all cases of at least 90 mol % and with a narrow molecular weight distribution.

The examples which follow are intended to illustrate the present invention in detail without restricting it.

EXAMPLE 1

Preparation of Catalyst-Initiator Mixtures which Trigger the Polymerization Reaction The following mixtures of Lewis acids, some comprising donors, as polymerization catalysts and initiators which can trigger the inventive polymerization reaction of isobutene or of isobutene-comprising monomer mixtures, or precursors thereof, were prepared as typical representatives of such systems:
(a) 1.4 g (0.015 mol) of methanesulfonic acid were dissolved in 75 ml of dichloro-methane, then 0.77 g (5.9 mmol) of di-n-butyl ether was added;
(b) 1.4 g (0.015 mol) of methanesulfonic acid were dispersed in 125 ml of toluene, then 0.77 g (5.9 mmol) of di-n-butyl ether was added;
(c) 2.0 g (0.015 mol) of aluminum trichloride were suspended in 75 ml of dichloro-methane, then 0.77 g (5.9 mmol) of di-n-butyl ether and 1.4 g (0.015 mol) of methanesulfonic acid were added;

(d) 2.0 g (0.015 mol) of aluminum trichloride were suspended in 125 ml of toluene; then 0.77 g (5.9 mmol) of di-n-butyl ether and 1.4 g (0.015 mol) of methane-sulfonic acid were added;

(e) 2.4 g (0.015 mol) of iron(III) chloride were suspended in 75 ml of dichloro-methane; then 0.77 g (5.9 mmol) of di-n-butyl ether was added;

(f) 2.4 g (0.015 mol) of iron(III) chloride were suspended in 125 ml of toluene; then 0.77 g (5.9 mmol) of di-n-butyl ether was added;

(g) 2.4 g (0.015 mol) of iron(III) chloride were suspended in 75 ml of dichloro-methane; then 0.77 g (7.5 mmol) of diisopropyl ether and 1.4 g (0.015 mol) of methanesulfonic acid were added;

(h) 2.0 g (0.015 mol) of zinc chloride were suspended in 75 ml of dichloromethane; then 0.77 g (7.5 mmol) of diisopropyl ether and 1.4 g (0.015 mol) of methanesulfonic acid were added;

(i) 2.0 g (0.015 mol) of zinc chloride were suspended in 75 ml of dichloromethane; then 0.77 g (5.9 mmol) of di-n-butyl ether and 1.4 g (0.015 mol) of methanesulfonic acid were added;

(j) 2.0 g (0.015 mol) of zinc chloride were suspended in 75 ml of dichloromethane; then 1.4 g (0.015 mol) of methanesulfonic acid were added;

(k) 2.4 g (0.015 mol) of iron(III) chloride were suspended in 75 ml of dichloro-methane; then 1.4 g (0.015 mol) of methanesulfonic acid were added;

(l) 2.0 g (0.015 mol) of aluminum trichloride were suspended in 75 ml of dichloro-methane; then 1.4 g (0.015 mol) of methanesulfonic acid were added;

(m) 1.4 g (0.015 mol) of methanesulfonic acid were dispersed in 75 ml of dichloro-methane; then 1.0 g (0.015 mol) of boron trifluoride was introduced;

(n) 1.4 g (0.015 mol) of methanesulfonic acid were dissolved in 125 ml of toluene; then 1.0 g (0.015 mol) of boron trifluoride was introduced;

(o) 2.6 g (0.015 mol) of p-toluenesulfonic acid were dissolved in 75 ml of dichloro-methane; then 1.0 g (0.015 mol) of boron trifluoride was introduced;

(p) 2.6 g (0.015 mol) of p-toluenesulfonic acid were dissolved in 125 ml of toluene; then 1.0 g (0.015 mol) of boron trifluoride was introduced.

EXAMPLE 2

Polymerization of "Raffinate 1" with $FeCl_3.Bu_2O$ and with Methanesulfonic Acid as an Initiator in Dichloromethane at −20° C.

14.86 g of "raffinate 1" comprising 5.94 g (106.0 mmol) of pure isobutene were polymerized in 130 ml of dichloromethane at −20° C. with 0.53 mmol of the catalyst complex composed of anhydrous iron(III) chloride and di-n-butyl ether in a molar ratio of 1:1 (in the form of a 1 molar solution in dichloromethane) in the presence of 0.015 mol of methanesulfonic acid as an initiator within 30 minutes at a conversion of 68% to give a polyisobutene with a number-average molecular weight $M_n$ of 2285, a polydispersity of 2.34 and a content of terminal double bonds of 91.7 mol %.

EXAMPLE 3

Polymerization of "Raffinate 1" with $FeCl_3.Bu_2O$ and with Methanesulfonic Acid as an Initiator in Dichloromethane at +20° C.

7.43 g of "raffinate 1" comprising 2.97 g (53.0 mmol) of pure isobutene were polymerized in 65.0 ml of dichloromethane at +20° C. with 0.53 mmol of the catalyst complex composed of anhydrous iron(III) chloride and di-n-butyl ether in a molar ratio of 1:1 (in the form of a 1 molar solution in dichloromethane) in the presence of 0.015 mol of methanesulfonic acid as an initiator within 30 minutes at a conversion of 92% to give a polyisobutene with a number-average molecular weight $M_n$ of 822, a polydispersity of 1.81 and a content of terminal double bonds of 93.1 mol %.

EXAMPLE 4

Polymerization of "Raffinate 1" with $FeCl_3.Bu_2O$ and with Methanesulfonic Acid as an Initiator in Toluene at +20° C.

7.43 g of "raffinate 1" comprising 2.97 g (53.0 mmol) of pure isobutene were polymerized in 65.0 ml of toluene at +20° C. with 0.53 mmol of the catalyst complex composed of anhydrous iron(III) chloride and di-n-butyl ether in a molar ratio of 1:1 (in the form of a 1 molar solution in dichloromethane) in the presence of 0.015 mol of methanesulfonic acid as an initiator within 30 minutes at a conversion of 20% to give a polyisobutene with a number-average molecular weight $M_n$ of 1000, a polydispersity of 2.20 and a content of terminal double bonds of 85.0 mol %.

EXAMPLE 5

Polymerization of "Raffinate 1" with $AlCl_3.Bu_2O$ and with Methanesulfonic Acid as an Initiator in Dichloromethane at +20° C.

14.49 g of "raffinate 1" comprising 5.79 g (103.4 mmol) of pure isobutene were polymerized in 125 ml of dichloromethane at +20° C. with 1.0 mmol of the catalyst complex composed of anhydrous aluminum chloride and di-n-butyl ether in a molar ratio of 1:1 (in the form of a 1 molar solution in dichloromethane) in the presence of 0.03 mol of methanesulfonic acid as an initiator within 5 minutes at a conversion of 73% to give a polyisobutene with a number-average molecular weight $M_n$ of 2491, a polydispersity of 2.97 and a content of terminal double bonds of 90.0 mol %.

The invention claimed is:

1. A process for preparing a high-reactivity isobutene homopolymer or copolymer, the process comprising:
    polymerizing an isobutene or an isobutene-comprising monomer mixture, thereby obtaining a high-reactivity isobutene homopolymer or copolymer with a content of terminal vinylidene double bonds per polyisobutene chain end of at least 50 mol %,
    wherein the polymerizing is in the presence of at least one Lewis acid polymerization catalyst or in the presence of a complex which is a polymerization catalyst formed from at least one Lewis acid and at least one donor,
    wherein the polymerizing is further in the presence of at least one initiator of formula Z—$SO_3H$, and
    Z is a $C_1$- to $C_{20}$-alkyl radical, $C_1$- to $C_{20}$-haloalkyl radical, $C_5$- to $C_8$-cycloalkyl radical, $C_6$- to $C_{20}$-aryl radical, or a $C_7$- to $C_{20}$-arylalkyl radical.

2. The process according to claim 1, wherein the at least one initiator is methanesulfonic acid, trifluoromethanesulfonic acid, trichloromethanesulfonic acid, toluenesulfonic acid, or any mixture thereof.

3. The process according to claim 1, wherein the polymerizing is in the presence of a complex, as a polymerization catalyst, formed from a Lewis acid comprising a binary chlorine or fluorine compound of an element of transition groups 1 to 8 or of main groups 3 to 5 of the Periodic Table, or any mixture thereof.

4. The process according to claim 3 wherein the binary chlorine or fluorine compound is at least one selected from the group consisting of $BCl_3$, $AlCl_3$, $TiCl_4$, $FeCl_2$, $FeCl_3$, $ZnCl_2$, $BF_3$, $AlF_3$, $TiF_4$, $FeF_2$, $FeF_3$, and $ZnF_2$.

5. The process according to claim 1, wherein the polymerization is in the presence of a complex, as a polymerization catalyst, which comprises, as the donor, an organic compound comprising an ether function or a carboxylic ester function.

6. The process according to claim 5,
wherein the organic compound functioning as the donor is a dihydrocarbyl ether of formula $R^1$—O—$R^2$ or a hydrocarbyl carboxylate of formula $R^3$—$COOR^4$
$R^1$ and $R^2$ are each independently $C_1$- to $C_{20}$-alkyl radicals, $C_5$- to $C_8$-cycloalkyl radicals, $C_6$- to $C_{20}$-aryl radicals, or $C_7$- to $C_{20}$-arylalkyl radicals, and
$R^3$ and $R^4$ are each independently $C_1$- to $C_{20}$-alkyl radicals, $C_5$- to $C_8$-cycloalkyl radicals, $C_6$- to $C_{20}$-aryl radicals, or $C_7$- to $C_{20}$-arylalkyl radicals.

7. The process according to claim 6, wherein the organic compound functioning as the donor has a total carbon number of from 3 to 16.

8. The process according to claim 1, wherein the polymerizing is also in the presence of at least one further initiator which is mono- or polyfunctional and is at least one selected from the group consisting of organic hydroxyl compounds, organic halogen compounds, protic acids and water.

9. The process according to claim 8, wherein the at least one further initiator is at least one selected from the group consisting of water, protic acids, methanol, ethanol, 1-phenylethanol, 1-(p-methoxyphenyl)ethanol, n-propanol, isopropanol, 2-phenyl-2-propanol, n-butanol, isobutanol, sec-butanol, tert-butanol, 1-phenyl-1-chloroethane, 2-phenyl-2-chloropropane, tert-butyl chloride, and 1,3-bis(1-hydroxy-1-methylethyl)benzene, 1,4-bis(1-hydroxy-1-methylethyl)benzene, and mixtures thereof.

10. The process according to claim 1, wherein the polymerizing is in the presence of from 0.01 to 10 mmol of a nitrogen-comprising basic compound, based on 1 mol of isobutene monomer in homopolymerization of isobutene or on 1 mol of a total amount of polymerizable monomers in copolymerization of isobutene.

11. The process according to claim 10, wherein the nitrogen-comprising basic compound is pyridine 2-methylpyridine, 3-methylpyridine, 4-methylpyridine, 2,3-dimethylpyridine, 2,4-dimethylpyridine, 2,5-dimethylpyridine, 2,6-dimethylpyridine, 3,4-dimethylpyridine, 3,5-dimethylpyridine, 3,6-dimethylpyridine, 2,4,6-trimethylpyridine, 2-tert-butylpyridine, 3-tert-butylpyridine, 4-tert-butylpyridine, 2-tert-butyl-6-methylpyridine, 2,4-di-tert-butylpyridine, 2,5-di-tert-butylpyridine, 2,6-di-tert-butylpyridine, 3,5-di-tert-butylpyridine, 2-phenylpyridine, 3-phenylpyridine, or 4-phenylpyridine.

12. The process according to claim 1, wherein the high-reactivity isobutene homo- or copolymer has a number-average molecular weight $M_n$ of from 500 to 250,000.

13. The process according to claim 1 wherein the high-reactivity isobutene homo- or copolymer has a polydispersity of from 1.05 to less than 3.5.

14. The process according to claim 1, wherein the polymerization is at a temperature of from −30° C. to +50° C.

15. The process according to claim 1, wherein the polymerizing is in an aliphatic hydrocarbon, cycloaliphatic hydrocarbon, aromatic hydrocarbon, halogenated aliphatic hydrocarbon, or any mixture thereof.

16. An isobutene polymer of formula I:

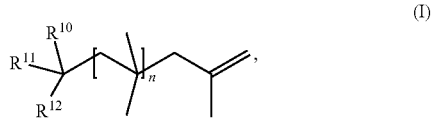

wherein $R^{10}$ is a sulfo moiety of formula —O—$SO_2Z$,
Z is a $C_1$- to $C_{20}$-alkyl radical, $C_1$- to $C_{20}$-haloalkyl radical, $C_5$- to $C_8$-cycloalkyl radical, $C_6$- to $C_{20}$-aryl radical, or a $C_7$- to $C_{20}$-arylalkyl radical,
$R^{11}$ and $R^{12}$ are each independently hydrogen, a $C_1$- to $C_{20}$-alkyl radical, a $C_5$- to $C_8$-cycloalkyl radical, a $C_6$- to $C_{20}$-aryl radical, or a $C_7$- to $C_{20}$-alkylaryl radical, and
n is from 9 to 4500.

* * * * *